May 30, 1933.  E. HIME  1,911,363
METHOD OF STROBOSCOPICALLY OBSERVING ROTATING
BODIES AND APPARATUS THEREFOR
Filed May 11, 1929   5 Sheets-Sheet 1

Inventor:
Eugenio Hime
By
Pennie Davis Marvin & Edmonds
attorneys

May 30, 1933.  E. HIME  1,911,363
METHOD OF STROBOSCOPICALLY OBSERVING ROTATING
BODIES AND APPARATUS THEREFOR
Filed May 11, 1929  5 Sheets-Sheet 2
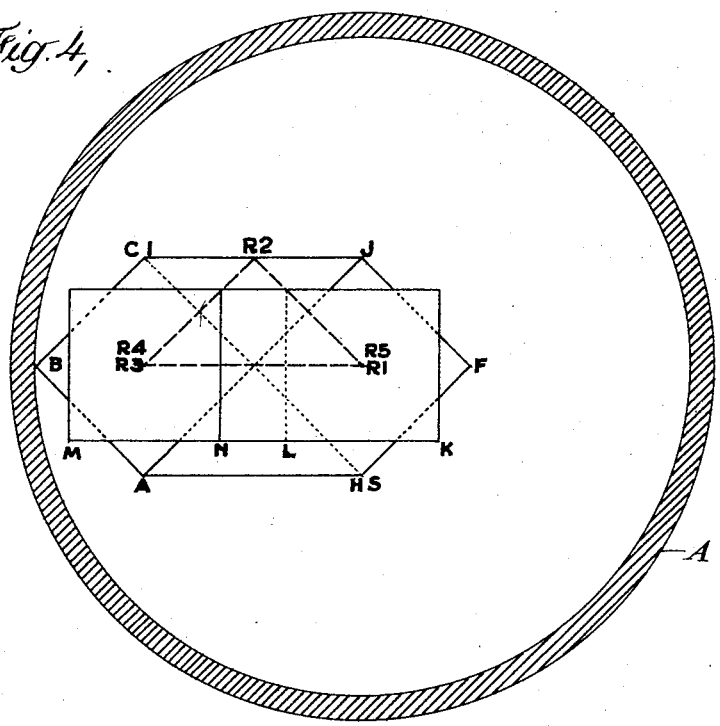
Fig. 4,
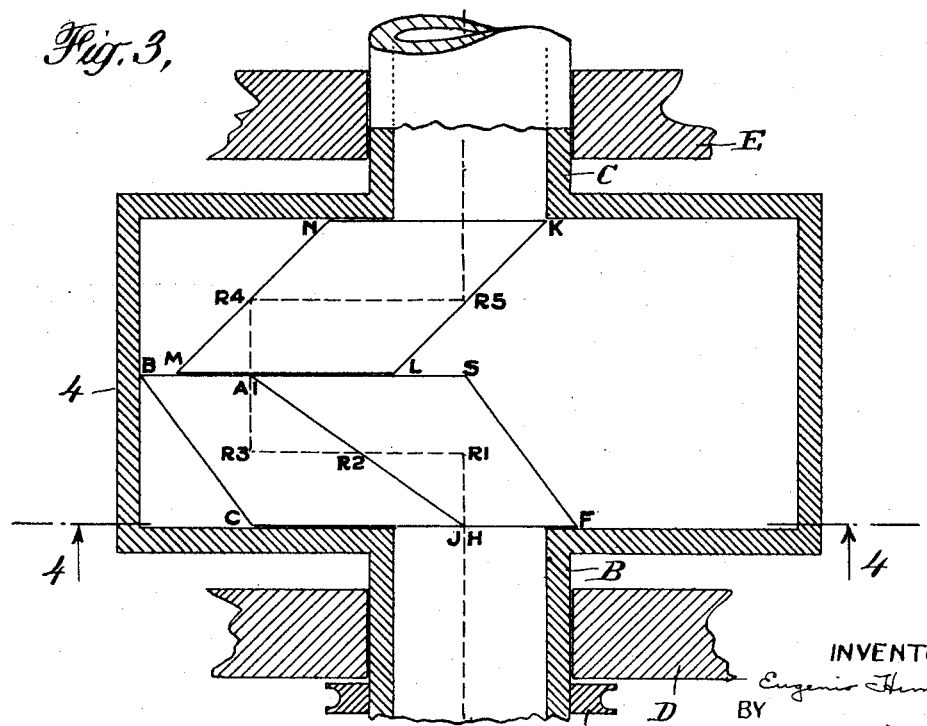
Fig. 3,
INVENTOR
Eugenio Hime
BY
Pennie, Davis, Marvin & Edmonds
HIS ATTORNEYS May 30, 1933.  E. HIME  1,911,363
METHOD OF STROBOSCOPICALLY OBSERVING ROTATING
BODIES AND APPARATUS THEREFOR
Filed May 11, 1929   5 Sheets-Sheet 3

INVENTOR
Eugenio Hime
BY
HIS ATTORNEYS

May 30, 1933.  E. HIME  1,911,363
METHOD OF STROBOSCOPICALLY OBSERVING ROTATING
BODIES AND APPARATUS THEREFOR
Filed May 11, 1929   5 Sheets-Sheet 4
Fig. 8,
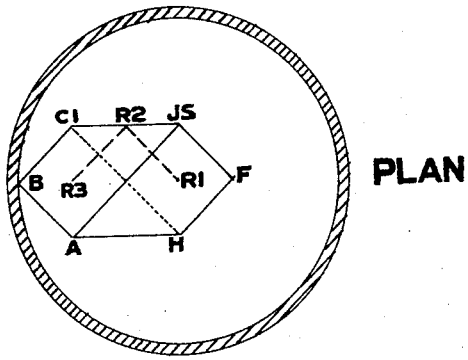
PLAN
Fig. 7,
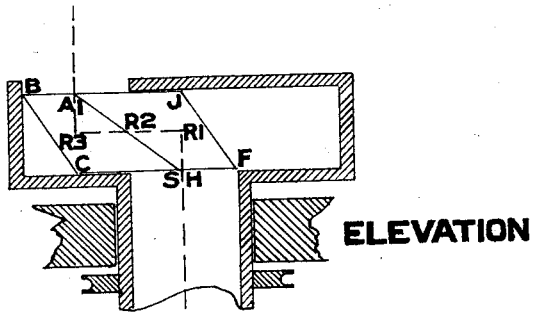
ELEVATION
Fig. 9,
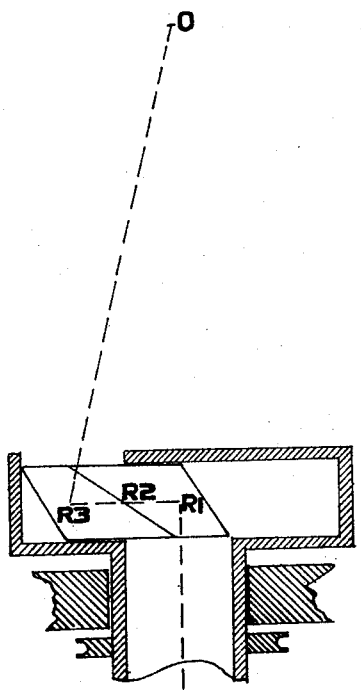
INVENTOR
Eugenio Hime
BY
HIS ATTORNEYS May 30, 1933.  E. HIME  1,911,363
METHOD OF STROBOSCOPICALLY OBSERVING ROTATING
BODIES AND APPARATUS THEREFOR
Filed May 11, 1929  5 Sheets-Sheet 5
Fig. 11,
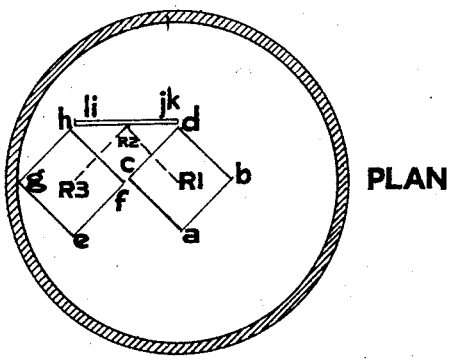
PLAN
Fig. 10,
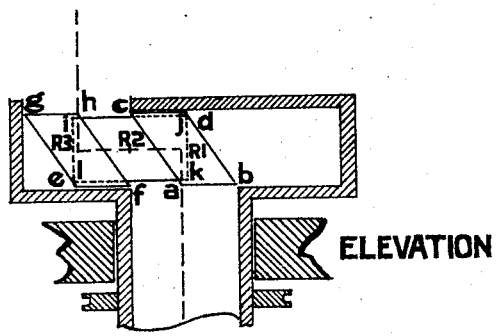
ELEVATION
Fig. 12,
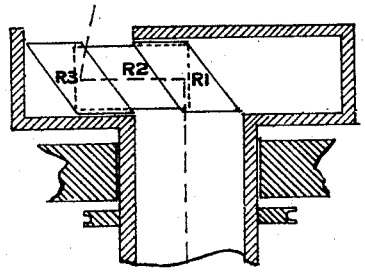
INVENTOR
Eugenio Hime
BY
Pennie, Davis, Marvin Edmonds
HIS ATTORNEYS Patented May 30, 1933

1,911,363

UNITED STATES PATENT OFFICE

EUGENIO HIME, OF RIO DE JANEIRO, BRAZIL

METHOD OF STROBOSCOPICALLY OBSERVING ROTATING BODIES AND APPARATUS THEREFOR

Application filed May 11, 1929, Serial No. 362,180, and in Brazil April 1, 1929.

The present invention relates to a method of rendering visible bodies endowed with rotary motion through the immobilization of their image; and its object is to provide means which make it possible to observe through the apparatus directly or through projection, the rotating body as if it were stationary, thus rendering it possible to get a clear image of the body and to ascertain its appearance under the action of said motion.

Broadly, the present method consists of the provision of an optical medium in which a cylindrical or conical beam of light passing through it is subjected to a certain number of reflections, which force it to follow a predetermined path. The reflections may be three or five in number. At the same time, to the optical medium is imparted a variable, controlled and adjustable rotary motion about a straight line (axis of rotation), parallel to or coinciding with the direction of the incident and emergent beams, the angular velocity or number of revolutions being measured by means of a velocimeter or counter of revolutions coupled to the apparatus.

The optical medium, provided in accordance with the invention, may be secured in practice, through combinations of prisms, mirrors, lenses and the like, as desired; and the apparatus thus carried out may serve for direct observation in the apparatus itself or for projection on a translucent or opaque screen.

The apparatus may be enclosed or secured to a metallic or other case, mounted so as to be capable of rotating at any desired speed.

Obviously, the apparatus may take the most varied forms, through the combination of known optical and mechanical devices, according to the requirements of every case.

In this way and for a better understanding of the invention, the following description is made with reference to the appended drawings, in which is shown schematically the path of the beam of light, according to the two above mentioned ways and in which:

Fig. 3 is a vertical elevation, partly in section, of one form of means for carrying out the principle illustrated in Fig. 2;

Fig. 4 is a cross-section on line 4—4 of Fig. 3, sighting in the direction of the arrows;

Figure 1:
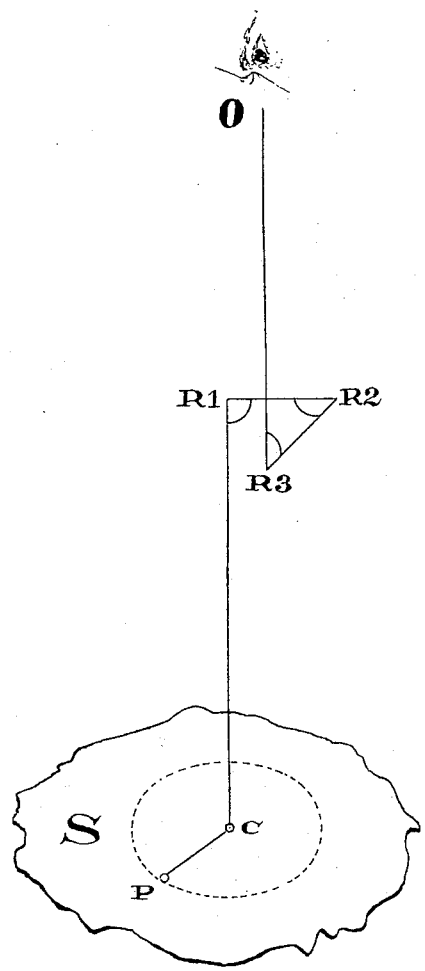
Figure 1 is a diagram of the path when the beam of light is subjected to three reflections.

Fig. 7 is a vertical elevation, partly in section, of an embodiment of the principle of Fig. 1; Fig. 8 is a sectional plan thereof; Fig 9 is a view similar to Fig. 7, the prism here having a face angled so as to direct the light towards the axis of rotation, and Figs. 10, 11 and 12 are similar respective views of a further embodiment of the principle of Fig. 1.

In Fig. 1, the beam of light from C is reflected by a surface $R_1$ to another surface $R_2$, which in turn reflects it to a third surface $R_3$, by which it is reflected, finally, toward the observer or projected on a screen. The reflecting surface $R_2$ is arranged so that it reflects the beam of light in a direction more or less normal to the plan formed by the two former paths, that is, the incident beam $CR_1$ and the reflected beam $R_1R_2$.

Now, if any desired rotary motion be imparted to the assembly of reflecting surfaces $R_1R_2$ and $R_3$ about $CR_1$ as an axis, the observer placed at O and looking in the direction $OR_3$ will see the image of any point P of an object S describe a circle about C, with an angular velocity exactly equal to twice the angular velocity imparted to the optical device.

Figure 2:
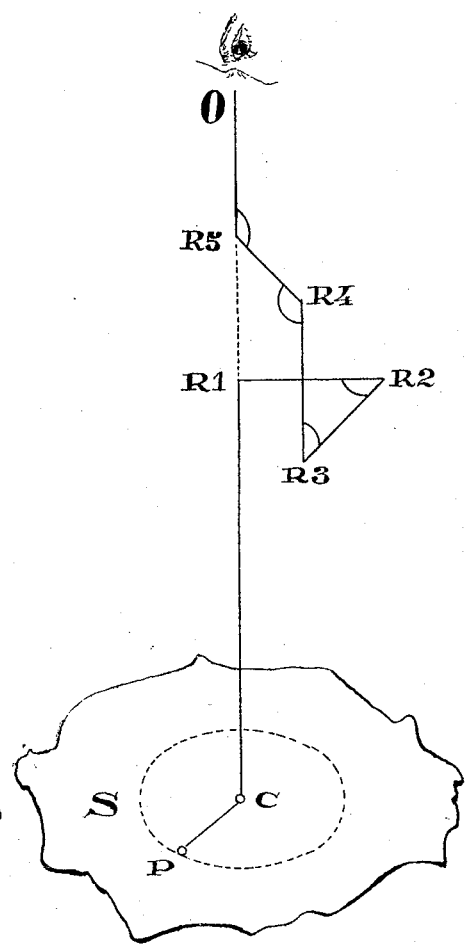
Fig. 2, a similar diagram, when the beam of light is subjected to five reflections.

For the convenience of the observer who, in the case of Fig. 1, would have to displace his eye so as to describe a circle having a radius $R_3O$, the apparatus shown in Fig. 2, may be employed, in which the beam reflected by $R_3$ is directed towards a surface $R_4$, which reflects it toward another surface $R_5$, which directs it so that it will emerge from the apparatus as an extension of the initial beam $CR_1$.

A working embodiment of the principle shown in Fig. 2 is illustrated in Figs. 3 and 4 and comprises a casing A in the form of a short hollow cylinder having central shafts B and C integral therewith. The casing is mounted suitably in bearings D and E, shown diagrammatically, and is rotated therein about its shorter axis by means of power suitably applied to a pulley F fixed to the lower end of one of the shafts. This pulley may, of course, be suitably connected to the rotating object the condition of which is to be observed, instead of being connected to a separate source of power. Within the casing there is a prism FSIBCAJH, shown in elevation in Fig. 3 and in bottom plan in Fig. 4, this prism being attached to the casing in any suitable manner with the point $R_1$ on the axis of rotation of the casing. This prism is formed from a single block with dihedral angles and faces such that the light entering the hollow shaft B from the rotating object is first totally reflected upwardly from face SFHB at the point $R_1$, as seen in Fig. 4, from its entering horizontal plane and then passes through the plane $R_1R_2$, being reflected from face AIJH downwardly in the same vertical plane to the point $R_3$ on the surface BAHC. From the point $R_3$ the light ray is reflected rearwardly in a horizontal plane, parallel to its entrant path but offset considerably to the left thereof.

Attached to the casing in any suitable manner and lying back of the first prism, is another prism KNML, shown in plan in Fig. 3 and in elevation in Fig. 4. Instead of being a three-total reflection prism, this prism is a two-total reflection prism, and reflects the ray received from $R_3$ at the point $R_4$ in the vertical surface having the edge MN in a right angle direction to the point $R_5$ on the surface KL. From this point the light ray is reflected as a continuation of its original path, and enters the eye of the observer.

Thus, the device being rotated at half the speed of the object under observation and in the opposite direction thereto, the object will appear to the observer to be stationary, so that he can record the exact condition of the body due to the rotation thereof.

Figure 6:
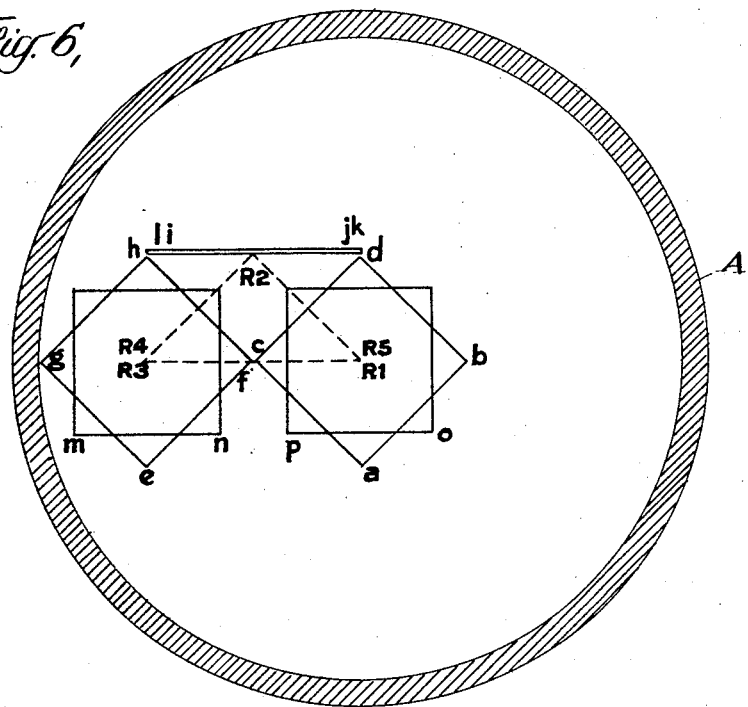
Fig. 6 is a cross-section on line 6—6 of Fig. 5 sighting in the direction of the arrows.
Figure 5:
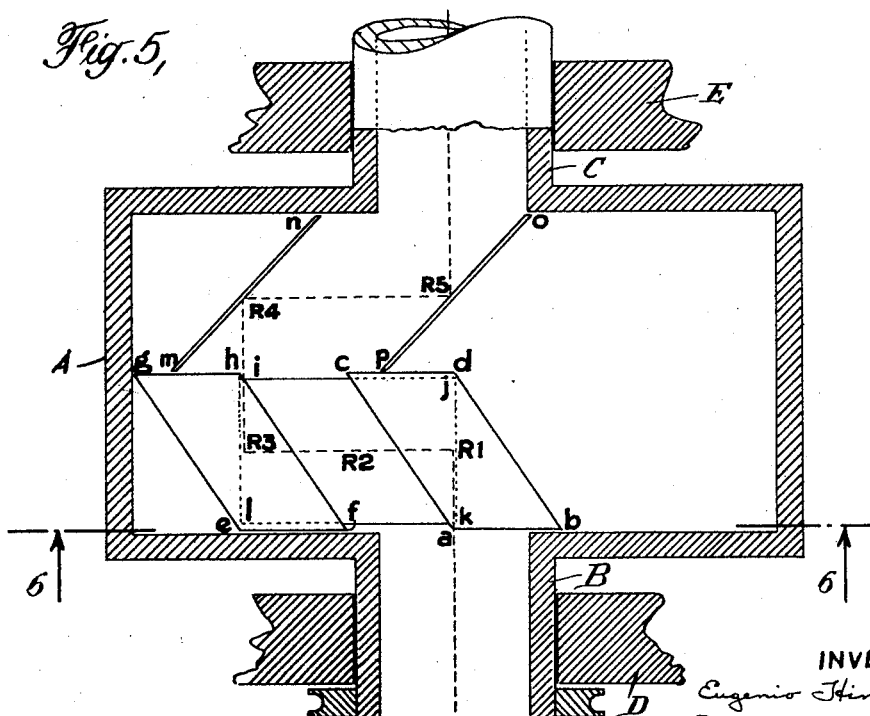
Fig. 5 is a vertical elevation, partly in section, of another embodiment of the principle shown in Fig. 2.

In Figs. 5 and 6 there is illustrated a modification of the device shown in Figs. 3 and 4, differing therefrom chiefly in that for the single three-reflection prism at the entrance to the device, there is substituted two single-reflection prisms $abcd$ and $efhg$, these prisms being identical with each other. These prisms are suitably attached to the casing with the center of prism $abcd$ on the axis of rotation of the device, and with the center of the other prism offset to the left therefrom a suitable distance. The horizontal entering light ray is reflected first upwardly in a vertical plane at point $R_1$, on surface $dba$ as shown in Fig. 6, and leaves the prism. A mirror $jilk$ is mounted suitably adjacent the prisms in a vertical plane and behind them in Fig. 6, and the light reflected from prism $abcd$ strikes this mirror at point $R_2$. From the point $R_2$ the ray is reflected downwardly to the point $R_3$ on the surface $ghe$ in the prism $efhg$, whence it is reflected rearwardly parallel to its entrant path, but offset considerably therefrom. Two mirrors $mn$ and $po$ are mounted vertically in the casing, inclines towards the other side of the casing and the left mirror $mn$ reflects the light at point $R_4$ to point $R_5$ on the other mirror, which in turn reflects the light to the eye of the observer.

The prism KMNL of Figs. 3 and 4 may be dispensed with if desired, the apparatus then embodying the principle of Fig. 1, as shown in Figs. 7-9 inclusive, the light then being reflected three times and the emergent ray being observed from a point off centre from the rotating casing. By such means, a much cheaper apparatus can be used to accomplish practically the same result as before, but this form none-the-less embodies the principle of deflecting at least one of the rays in a plane perpendicular to that of the other reflections.

The mirrors MN and OP of Figs. 5 and 6 may also be dispensed with to form the embodiment shown in Figs. 10 to 12 inclusive, retaining only the single mirror $jklh$, this embodiment then carrying out the principle of Fig. 1 in substantially the same manner.

In all the embodiments illustrated, it is contemplated, however, that the entering ray be first reflected in a plane normal to the plane of the other paths of the light, whereby there is produced an apparatus in which are eliminated much of the paraphernalia hitherto required, and enabling the device to be constructed so small and compact as to be adapted to be employed in very close quarters, yet none the less making possible a clearer and more satisfactory observation of the rotating body.

The apparatus just described and shown schematically in the drawings possesses the following properties:

(1). If any object, stationary with reference to the observer, be viewed through the apparatus and the latter is made to revolve about its axis of rotation through a certain angle A, the image of the object looked at will rotate through an angle 2A from its original position, with the optical axis of the apparatus as a center.

(2). If any object or device endowed with rotary motion be observed through the apparatus and the latter is given a rotary motion, the angular velocity of the observed image will vary, increasing or diminishing with reference to the velocity of the object, according as the apparatus is rotated in an opposite or in the same direction as the object.

(3). When the rotation of the apparatus is in the direction which causes a diminution of the angular velocity of the observed image, the latter will be seen absolutely stationary with reference to the observer, if the angular velocity of the apparatus is equal to one half the angular velocity of the object.

With the above properties, the apparatus may serve to give the impression of being stationary a body endowed with a rotary motion; and this whether it is used by itself or adapted to any other optical device.

It is apparent that the apparatus may thus have numberless practical applications. With the apparatus, one can observe, directly or through projection, the stationary image of a disk which is being played in a talking machine, thus being able to read the title on the disk, without stopping the machine. In this case, the apparatus may be driven manually, by means of clockwork or through the mechanism driving the disk, to maintain constant the ratio of 1 to 2 between the angular velocities of the apparatus and of the disk.

Another application, of the numberless ones the apparatus may have, is to measure the velocity of rotation of the helixes of airplanes, of flying wheels, of locomotive driving wheels and those of any other vehicles in motion.

In industry, the apparatus may serve to render visible or to photograph what takes place within centrifugals, mixers and similar machines; or to show the behavior of balls in ball bearings; or to measure the slipping of belts or pulleys, by coupling the apparatus to the shaft.

In addition, the apparatus may be useful in cinematographic or photographic or projection tricks or even as an interesting toy.

The apparatus may also be used to increase the precision of a variety of measuring devices, operating as an angle multiplier.

Two or more apparatuses may be mounted in series, with their axes of rotation alined, to multiply the effect. With one apparatus, as hereinbefore mentioned, the ratio of the angular velocities of the apparatus and the object, to make the image of the latter stationary, is 1 to 2. With two apparatuses, arranged in series, the second rotating in a direction opposite to that of the first and with the same angular velocity, the ratio of the angular velocities of the apparatuses, and the object, so that the image remains stationary, is 1 to 4 or 1 to $2^2$. Wth three apparatuses, under the same conditions, the third one rotating in opposite direction to that of the second, the ratio of the angular velocities, to make the image stationary, will be 1 to 8, or 1 to $2^3$, the exponent of 2 expressing the number of apparatus coupled together.

In a general way, for N apparatus mounted as specified, the apparatus of odd numbers rotating in one direction and those of even numbers rotating in the opposite direction, the ratio of the angular velocities of the apparatus and the rotating object, to make the image of the latter stationary, is 1 to $2^N$.

Having thus fully described my invention, what I claim as new and desire to secure by Letters Patent is:

1. The method of stroboscopically observing rotating bodies comprising immobilizing their image by reflecting a light therefrom subjecting the light rays from said body to at least three non-coplaner reflections and rotating these reflections at a speed less than that of the rotating body and in the same direction thereto.

2. A device of the class described, comprising a casing having hollow central shafts attached thereto, bearings for the shafts, means for rotating the casing in the bearings, means in the casing for reflecting light rays in three non-coplaner paths, at least one of which is vertical, and means in the casing for reflecting the light ray out of the casing as a continuation of its entrant path.

3. A device of the class described, comprising a casing having hollow central shafts attached thereto and adapted to receive light rays, bearings for the shafts, means for rotating the casing in the bearings, a combination of three total-reflecting surfaces for the light rays cut in a single block located in the casing, and means in the casing for reflecting this three-reflected light rays out of the casing as a continuation of its entrant path.

4. A device of the class described, comprising a casing having hollow central shafts attached thereto, and adapted to receive light rays, bearings for the shafts, means for rotating the casing in the bearings, a combination of three total-reflecting surfaces cut in a single block, located in the casing and a combination of two total-reflecting surfaces for the light rays cut in a single block, said block being arranged rearwardly of said first block in such a way as to reflect the light received from said first block out of the casing as a continuation of the said ray.

5. In a device of the class described, a triangular prism mounted with its optical axis on the axis of rotation of the device, said triangular prism reflecting received light in a vertical direction, a mirror mounted on said prism thereabove, and reflecting said vertical ray downwardly, an identical prism mounted in parallel with said first prism and underneath said mirror, said prism reflecting light received from said mirror in a horizontal direction, another mirror mounted vertically in said casing with its center on the optical axis of said second prism, said mirror reflecting light received from said second prism at right angles thereto, and a third mirror mounted vertically in said casing with its center on the axis of rotation of said device, said third mirror reflecting light received from said second mirror as a continuation of the entrant ray.

6. In combination, a shaft, a plurality of the devices of claim 8 mounted thereon in a straight line along the axis of the apparatus for rotation in different directions, and means for rotating adjacent ones of said devices in opposite directions thereby immobilizing the light-rotations.

7. The improvement in the method of stroboscopically observing rotating bodies, comprising causing a beam of light to emanate from the rotating body, and subjecting said beam to three reflections, directing the path of said beam on the second reflection substantially normal to the path of the beam undergoing the first reflection, and directing the path of the beam on the third reflection substantially normal to the plane formed by the incidence-beam of the second reflection and the reflection beam of the first reflection, at the same time rotating the beam undergoing reflection in the same direction as that of the rotaitng body and at a lesser angular velocity.

8. The improvement in the method of stroboscopically observing rotating bodies by immobilizing their images, comprising causing a beam of light to emanate from the rotating body, and subjecting said beam to five total reflections, directing the path of said beam on the second reflection substantially normal to the path of the beam undergoing the first reflection, directing the path of the beam on the third reflection substantially normal to the plane formed by the incidence-beam of the second reflection and the reflection beam of the first reflection, directing the said beam on the fourth reflection towards the geometric prolongation of the initially-incident part of the beams, the said beam portions being thereby caused to intersect, and subjecting the beam thereat to a fifth reflection whereby the emergent beam lies in the prolongation of the initial beam, at the same time rotating the beam undergoing these reflections in a direction opposite to that of the rotating body and at a lesser angular velocity.

In testimony whereof I affix my signature.

EUGENIO HIME.